(12) United States Patent
Sparr

(10) Patent No.: US 9,440,676 B1
(45) Date of Patent: Sep. 13, 2016

(54) TIE ROD ASSEMBLY WITH INTEGRATED SAFETY TIP

(71) Applicant: Christopher E. Sparr, Lakeville, OH (US)

(72) Inventor: Christopher E. Sparr, Lakeville, OH (US)

( * ) Notice: Subject to any disclaimer, the term of this patent is extended or adjusted under 35 U.S.C. 154(b) by 0 days.

(21) Appl. No.: 14/818,655

(22) Filed: Aug. 5, 2015

(51) Int. Cl.
*B62D 7/16* (2006.01)
*B62D 7/20* (2006.01)

(52) U.S. Cl.
CPC ..................................... *B62D 7/20* (2013.01)

(58) Field of Classification Search
CPC ........ B62D 7/16; B62D 7/163; B62D 7/166; B62D 7/18
USPC ............... 280/93.508, 93.51, 93.511, 93.512
See application file for complete search history.

(56) References Cited

U.S. PATENT DOCUMENTS

| | | | | | |
|---|---|---|---|---|---|
| 4,035,094 | A | * | 7/1977 | Herbenar | B62D 7/16 403/136 |
| 4,225,260 | A | * | 9/1980 | Gaines | B62D 7/18 285/264 |
| 5,066,160 | A | * | 11/1991 | Wood | B62D 7/166 403/132 |
| 5,816,731 | A | * | 10/1998 | Howard | B62D 7/16 403/120 |
| 2002/0102126 | A1 | * | 8/2002 | Kincaid | B60G 7/005 403/133 |
| 2003/0053853 | A1 | * | 3/2003 | Wasylewski | B62D 7/16 403/122 |
| 2004/0071501 | A1 | * | 4/2004 | Ureach | B60G 7/005 403/135 |
| 2005/0111908 | A1 | * | 5/2005 | Green | B62D 7/166 403/132 |
| 2007/0007740 | A1 | * | 1/2007 | Downs | B60G 7/005 280/93.511 |
| 2008/0240847 | A1 | * | 10/2008 | Crouse | B62D 7/166 403/122 |
| 2009/0218777 | A1 | * | 9/2009 | Wood | B64C 1/06 280/93.51 |
| 2013/0022388 | A1 | * | 1/2013 | Carli | B62D 7/18 403/39 |

* cited by examiner

*Primary Examiner* — Toan To
(74) *Attorney, Agent, or Firm* — Mueller Law, LLC; Jerry K. Mueller, Jr.

(57) ABSTRACT

Disclosed is a tie rod having a threaded shaft at a proximal end and a body at a distal end. The body has a spherically expanded, substantially empty interior and having a truncated top and a truncated bottom. Each truncated top and bottom having a hole wherein the holes are in alignment transverse to the longitudinal extent of the tie rod. A tie rod pin has a distal end that extends through the truncated bottom body hole and terminated with a threaded distal end, an intermediate spherical section movably nested within the spherically expanded truncated tie rod body, and a distal end that extends from the spherical section through the truncated top body hole and being terminated with a plate being larger in diameter than the hole that penetrates the upper truncated body so that the tie rod pin is restrained from pulling through the tie rod body.

6 Claims, 2 Drawing Sheets

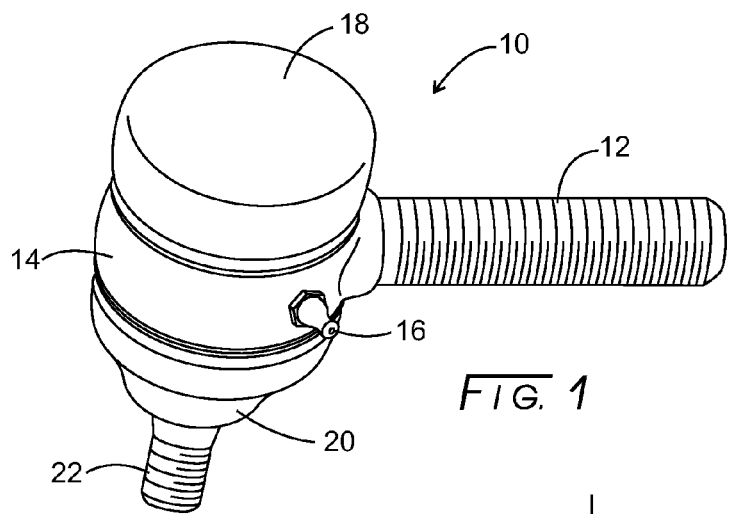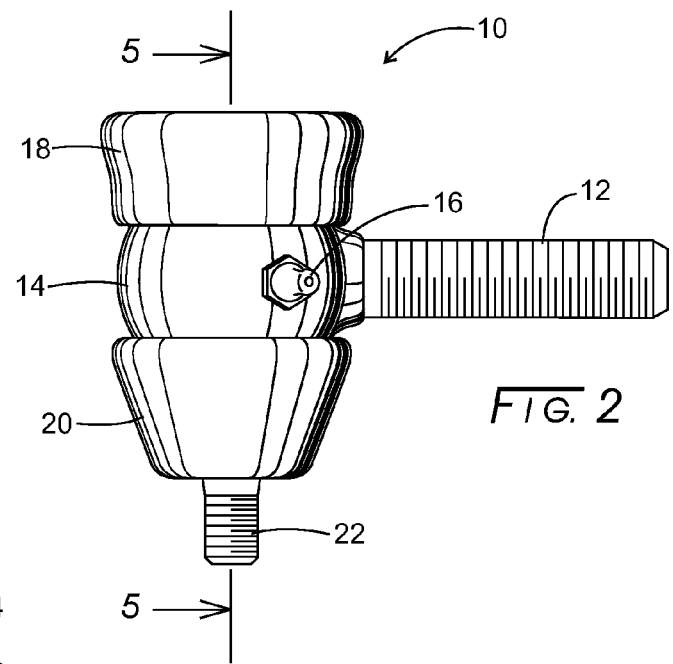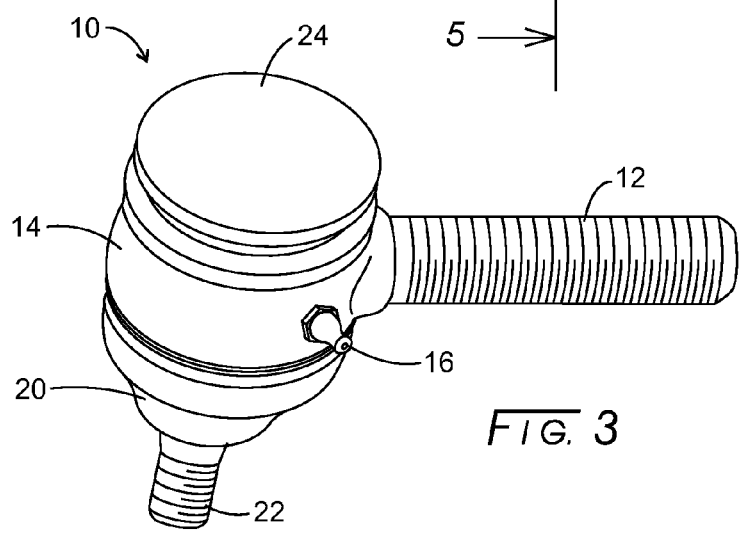

TIE ROD ASSEMBLY WITH INTEGRATED SAFETY TIP

CROSS-REFERENCE TO RELATED APPLICATIONS

None.

STATEMENT REGARDING FEDERALLY SPONSORED RESEARCH

Not applicable.

BACKGROUND

The present disclosure relates to traditional automotive tie rods and more particularly to a design that restrains the tie rod ends from becoming dislodged from their housing. A common issue that is seen with traditional tie rod ends is joint separation, which occurs when the tie rod end housing separates from the inner stud of the tie rod end. Such separation allows the tie rod to fall free from the axle spindle, which will cause loss of steering control to the wheel to which it was attached.

BRIEF SUMMARY

The improved design adds a safety feature that will not allow complete tie rod end joint separation, greatly reducing the potential of loss of steering in the event of tie rod end joint failure. The improved tie rod end has an integrated safety feature of a disc that is part of the inner mounting stud of the tie rod end that extends through the bottom of the housing of the tie rod end. The safety disc has a larger outside diameter than the inner diameter of the tie rod end housing, which allows the safety disc to catch the tie rod housing and not allow it to separate completely from the mounting stud of the tie rod end. The improved tie rod end design is sealed to limit contamination from moisture and dirt, and has the ability to be greased using a normal grease gun. This tie rod end design is not intended to prevent the tie rod end joint from failing as a result of normal wear, but it does have the added safety feature of preventing loss of steering if the joint does fail.

Disclosed is a tie rod having a threaded shaft at a proximal end and a body at a distal end. The body has a spherically expanded, substantially empty interior and having a truncated top and a truncated bottom. Each truncated top and bottom having a hole wherein the holes are in alignment transverse to the longitudinal extent of the tie rod. A tie rod pin has a distal end that extends through the truncated bottom body hole and terminated with a threaded distal end, an intermediate spherical section movably nested within the spherically expanded truncated tie rod body, and a distal end that extends from the spherical section through the truncated top body hole and being terminated with a plate being larger in diameter than the hole that penetrates the upper truncated body so that the tie rod pin is restrained from pulling through the tie rod body.

BRIEF DESCRIPTION OF THE DRAWINGS

For a fuller understanding of the nature and advantages of the present method and process, reference should be had to the following detailed description taken in connection with the accompanying drawings, in which:

FIG. 1 is an isometric view of the disclosed tie rod assembly;

FIG. 2 is a side view of the tie rod assembly of FIG. 1;

FIG. 3 is an isometric view like FIG. 1, but with the dust cover removed;

Figure 4:
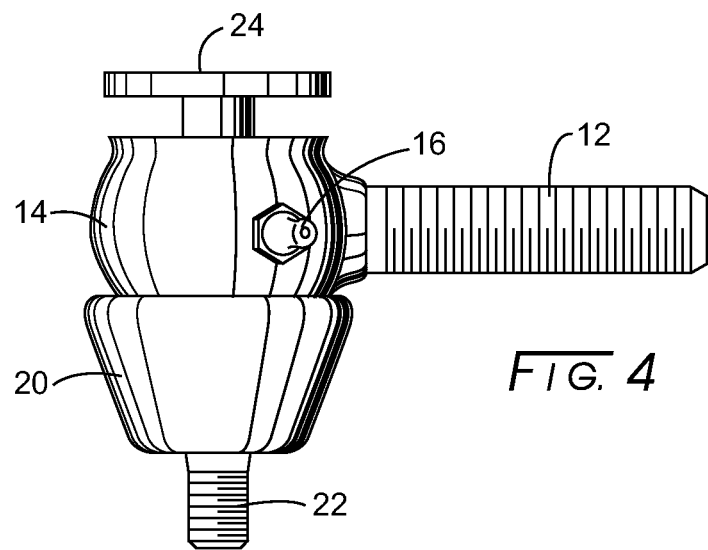
FIG. 4 is a side view of the tie rod assembly of FIG. 3.

The drawings will be described in greater detail below.

DETAILED DESCRIPTION

Referring initially to FIGS. 1 and 2, a tie rod assembly, 10, has a tie rod, 12, extending outward from tie road assembly 10. The proximal end of tie rod 12 is threaded. The distal end of tie rod 12 is formed into a body, 14, having spherically expanded interior that is substantially empty. The body has a truncated top and a truncated bottom. Both the truncated body top and truncated bottom of body 14 have a hole penetrating therethrough. The holes are in alignment transverse to the longitudinal extent of tie rod 12. Such holes are composed of an aperture located at the top truncated surface of body 14 and an aperture located at the lower truncated surface of body 14. A grease port, 16, extends outwardly from body 14 and communicates with the spherically expanded interior of body 14 for lubrication purposes.

The upper and lower edges of body 14 are rolled to form a lip. Sealing the spherically expanded interior of body 14 are an upper flexible cover 18 and a lower flexible cover 20. These flexible covers keep dust out of the spherically expanded interior of body 14 and lubricant (e.g., grease) inside the spherically expanded interior of body 14. Flexible covers 18 and 20 fit over the rolled edges for keep the covers in place.

A tie rod pin, 22, extends through apertures in body 14 while the distal end of tie rod pin 22 is terminated with a plate, 24 (see FIGS. 3 and 4 also). The lower proximal end of tie rod pin 22 is threaded and extends through the aperture located at the top surface of body 14 and an aperture located at the lower surface of body 14. The lower proximal threaded end of tie rod pin 22 extends through the aperture located at the bottom surface of body 14 and the distal end of tie rod pin 22 terminated with plate 24 extends through the aperture located at the upper surface of body 14.

Figure 5:
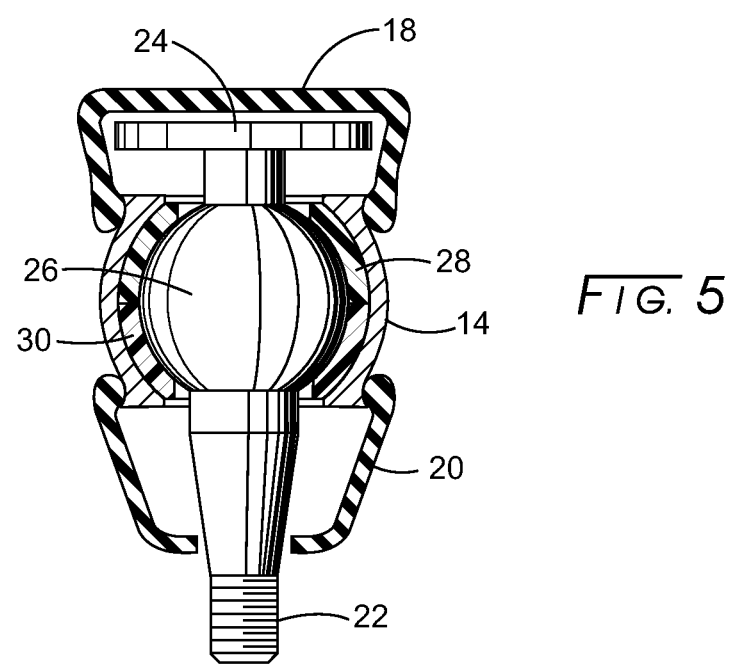
FIG. 5 is a sectional view taken along line 5-5 of FIG. 2.

Referring now also to FIG. 5, the spherically expanded interior of body 14 is seen. FIG. 5 also shows that a spherical section, 26, is movably nested within the expanded spherical section of tie rod 12 and is located nearer the distal end of tie rod pin 22 close to plate 24. Spherical section or orb 26 is movable within the expanded spherical section of tie rod 12 to accommodate movement of tie rod pin 22.

Between the inside walls of body 14 and spherical section or orb 26 are a pair of bushings. Specifically, an upper bushing, 28, may be formed of reinforced nylon, steel, or other suitable material and a lower bushing, 30, may be formed of fiber reinforced nylon or other suitable material. The bushings are desirable to accommodate for the movement tie rod pin 22 within body 14.

It will be observed that the diameter of plate 24 is much larger than the size of the opening in the top surface of body 14 where the distal end of tie rod pin 22 sticks out. While plate 24 could be circular in shape, it also could be square, rectangular, or other geometric shape, providing that the lateral extent of plate 24 precludes pin 24 from pulling out of body 14.

Materials of construction for both tie rod 12 and tie rod pin 22 are conventional for automotive tie rod assemblies, which normally steel; although, other metals may be used as well as alloys.

While the device and assembly have been described with reference to various embodiments, those skilled in the art will understand that various changes may be made and equivalents may be substituted for elements thereof without departing from the scope and essence of the disclosure. In addition, many modifications may be made to adapt a particular situation or material to the teachings of the disclosure without departing from the essential scope thereof. Therefore, it is intended that the disclosure not be limited to the particular embodiments disclosed, but that the disclosure will include all embodiments falling within the scope of the appended claims. In this application all units are in the U.S. system and all amounts and percentages are by weight, unless otherwise expressly indicated. Also, all citations referred herein are expressly incorporated herein by reference.

I claim:

1. A tie rod assembly with integrated safety tip, which comprises:
   (a) a tie rod having a threaded shaft at a proximal end and a body at a distal end, the body having a spherically expanded, substantially empty interior, the body having a truncated top and a truncated bottom, the truncated body having hole at its truncated top and a hole at its truncated bottom, wherein both holes are in alignment transverse to the longitudinal extent of the tie rod;
   (b) a tie rod pin having a distal end that extends through the truncated bottom body hold and terminated with a threaded distal end, an intermediate spherical section movably nested within the substantially empty, spherically expanded truncated tie rod body, and a distal end that extends from the spherical section through the truncated top body hole and being terminated with a plate being larger in diameter than the hole that penetrates the upper truncated body so that the tie rod pin is restrained from pulling through the tie rod body.

2. The tie rod assembly of claim 1, wherein the truncated body top has an annular lip and the truncated body bottom has an annular lip.

3. The tie rod assembly of claim 2, further comprising a top annular flexible cover having a bottom held by the truncated top annular lip with the distal tie rod pin penetrating therethrough with the proximal plate end outside of the top annular flexible cover.

4. The tie rod assembly of claim 3, further comprising an annular bottom flexible cover having a top held by the truncated bottom annular lip with proximal threaded end penetrating to the outside through the annular bottom flexible cover.

5. The tie rod assembly of claim 1, further comprising a pair of upper and lower reinforced bushings located within the tie rod body and around the tie rod pin spherically section.

6. The tie rod assembly of claim 4, further comprising a pair of upper and lower reinforced bushings located within the tie rod body and around the tie rod pin spherically section.

* * * * *